May 12, 1931. W. E. CRAWFORD ET AL 1,804,461
METHOD OF AND MEANS FOR WELDING WITHOUT ELECTRICAL LEAKAGE
Filed March 12, 1928 2 Sheets-Sheet 2
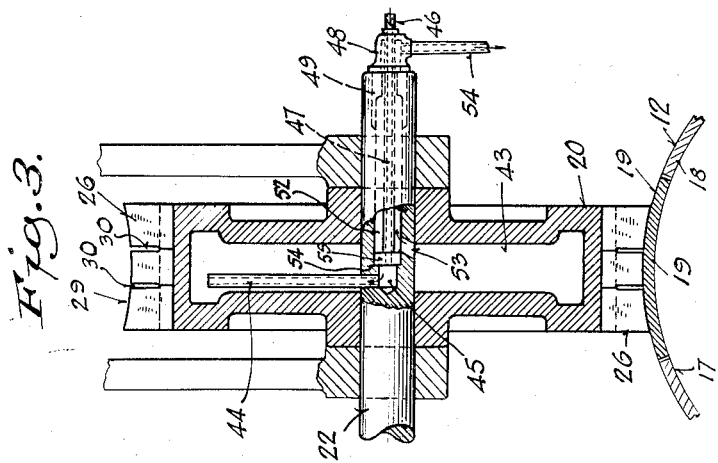
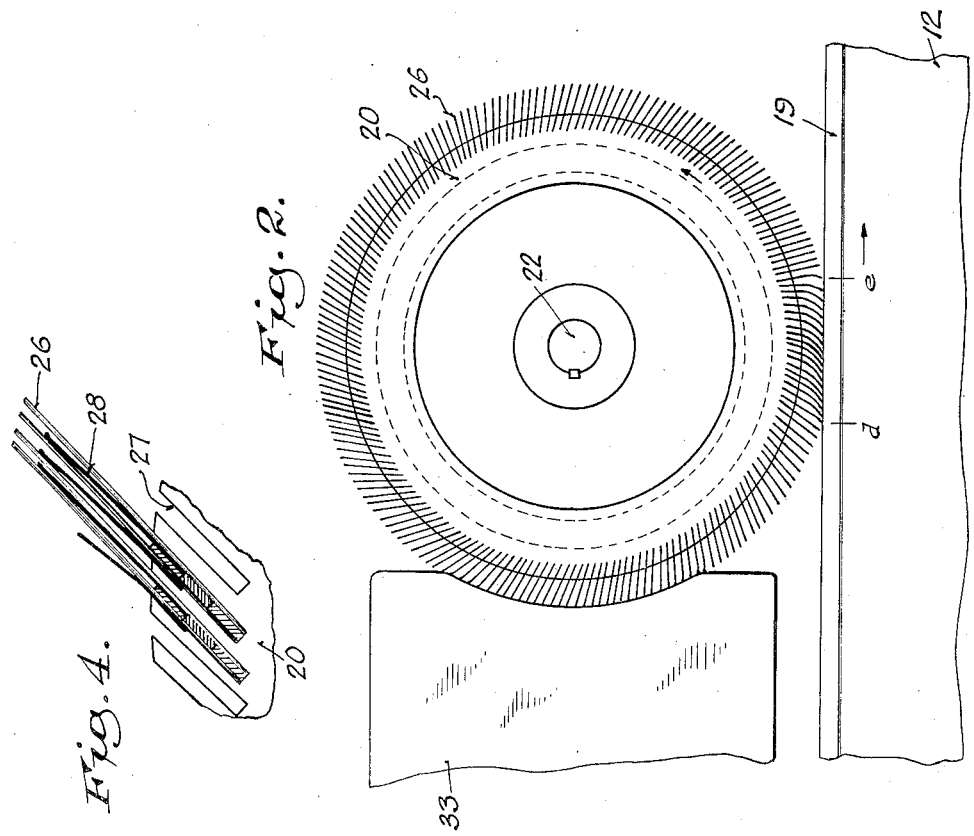
INVENTORS:
WILLIAM E. CRAWFORD
AND REIMAR C.F. KURTZE
BY
ATTORNEY.

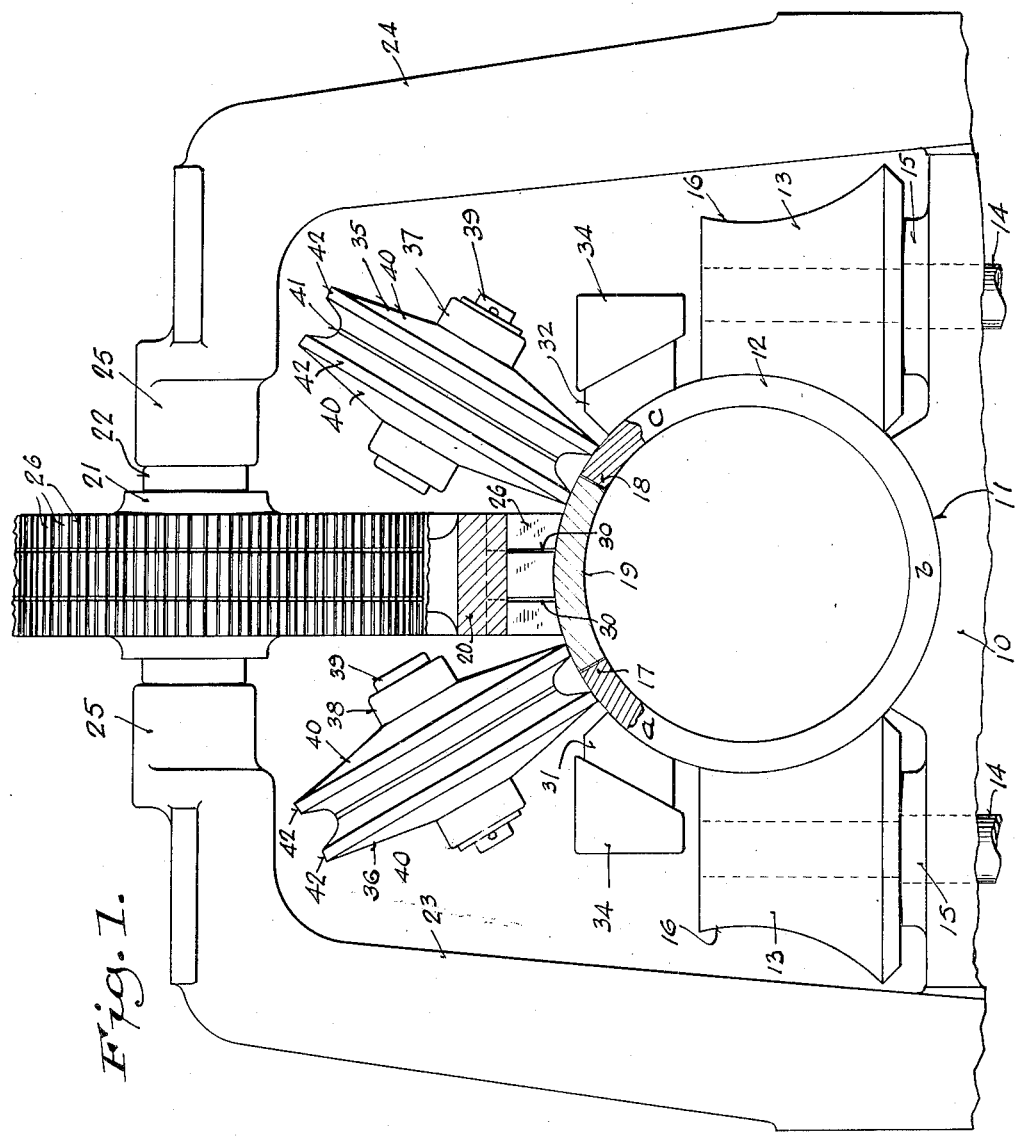

Patented May 12, 1931

1,804,461

UNITED STATES PATENT OFFICE

WILLIAM E. CRAWFORD, OF WAUWATOSA, AND REIMAR C. F. KURTZE, OF MILWAUKEE, WISCONSIN, ASSIGNORS TO A. O. SMITH CORPORATION, OF MILWAUKEE, WISCONSIN, A CORPORATION OF NEW YORK

METHOD OF AND MEANS FOR WELDING WITHOUT ELECTRICAL LEAKAGE

Application filed March 12, 1928. Serial No. 261,025.

This invention relates to electrical welding processes and more particularly to current supplying means therefor, although certain features thereof may be employed with equal advantage for other purposes.

It contemplates more especially the provision of means for eliminating electrical leakage and minimizing electrode temperatures incidental to the application of heating currents in the process of welding.

In the process of electric welding, there is a substantial leakage of current due to the travel thereof through the article being welded instead of across the edges to be welded. This is particularly evident in the manufacture of tubular articles such as pipe, since the adjacent edges thereof present a substantial electrical resistance as compared with the resistance offered to the flow of the current around the back of the pipe. As a result, substantial portions of the electric current pass between the electrodes through the medium of the pipe or other article rather than across the abutting edges to be joined, thereby creating a substantial loss of electrical energy which would otherwise be expended for heating the edges.

Further, the heretofore proposed electrodes employed in welding apparatus generate excessive heat which is injurious to the contacts, and give rise to non-uniform concentrated local heating. In view thereof, the weld is not uniformly durable or productive of an effective joinder capable of resisting the required stresses.

One object of the present invention is to provide a novel method of electrically welding an article or articles to create a permanent joinder of the edges.

Another object is to provide a novel method of electric welding wherein electrical leakage is eliminated or at least reduced to a minimum.

Still another object is the provision of novel electrical contacts which are capable of conforming with imperfections and irregularities existent on the areas of current application.

A further object is to provide contacts of comparatively large area which avoid the generation of excessive temperatures destructive thereto.

A still further object is the provision of a novel method of producing tubular members by electric welding without the usual electrical leakage and the generation of excessive temperatures in the vicinity of the electrodes.

Still a further object is to provide welding electrodes which generate minimum heat and are capable of being maintained at sufficiently low non-destructive temperatures.

Other objects and advantages will appear from the following description of an illustrative embodiment of the present invention.

In the drawings:

Figure 1 is a fragmentary view in elevation of a device embodying features of the present invention.

Figure 2 is a side view in elevation which diagrammatically discloses a rotary electrode for conveying current from the electrical supply to the article under operation.

Figure 3 is a sectional view in elevation of a rotary electrode employed in connection with the welding device disclosed in Figure 1.

Figure 4 is an enlarged fragmentary detailed view showing the manner in which contact plates are embedded in the rotary electrode.

The structure selected for illustration exemplifies a method of electric welding embodying features of the present invention, there being disclosed a device consisting of a frame 10 provided with a longitudinally disposed median concavity 11. The concavity 11 is adapted to receive a tubular article 12 to be welded and is preferably provided with a curvature corresponding to the peripheral curve of the tubular article and thereby serve to guide the article along a predetermined path defined by the concavity. Confronting feed rollers 13, in this instance two, are disposed adjacent the concavity for rotary movement in unison with vertical axes 14 journaled in bearings 15 fixed to the frame 10 in any suitable manner for operative connection with a source of mechanical power. It is to be noted that the rollers 13 are provided with an arcuate surface 16 which conforms with the concavity 11 to serve as a circumferential extension thereof surrounding the tubular member 12 and frictionally engaging the same to effect the traverse thereof along a linear path defined by the concavity 11 which serves as a guide therefor.

In order to avoid electrical waste occasioned by back-leakage which results from the flow of current through the medium of the pipe 12 defining a path $a$—$b$—$c$ rather than $a$—$c$ between the adjacent edges thereof, the present invention contemplates the formation of a blank in the form of an incomplete tube 12 so that the adjacent edges 17 and 18 are maintained in spaced circumferential relation. A strip of metallic material 19, preferably arched to conform with the curvature of the tube 12, is interposed between the edges 17 and 18 thereof to form a segment of the tubular article 12 in the final form.

The metallic insert strip 19 facilitates the application of an electrode of comparatively large surface area to preclude the generation of excessive temperatures which are injurious thereto. To this end, an electrode 20 consisting of a circular wheel is provided with a hub 21 at the axis thereof to receive a tubular shaft 22 therethrough for support between converging standards 23 and 24. The standards 23 and 24 terminate in confronting arms 25 to sustain the tubular shaft 22 in horizontally disposed position so as to permit rotary movement of the circular electrode 20 in the path of the article 12 along the median line thereof.

Electrical contact is established with the tube 12, preferably in the region of the metallic insert or strip 19 by embedding flexible contact strips 26 around the periphery thereof in an inclined position. The contact strips 26 are preferably composed of copper having a portion thereof embedded in slots 27 provided in the periphery of the electrode 20. Non-magnetic metallic springs 28 consisting of resilient sheet material are inserted in the slots 27 adjacent the contact strips 26 so that the free extremities thereof will impinge against the next succeeding contact to maintain them rigid in their initial position without interfering with the yieldability thereof.

The yieldable contact strips insure an efficient electrical contact, since these conform with imperfections and irregularities existent on the surface of the article in the path thereof. The metallic contact strips 26 have the extreme contacting edges 29 thereof curved to correspond with the arcuate surface presented by the article 12, in this instance the metallic strip 19, disposed in the path thereof to contact therewith. As shown, the metallic contact strips 26 are provided with radially disposed slots 30, in this instance two, to render the contacts more resilient and also to permit the circulation of air therebetween to effect the cooling thereof during the rotary movement occasioned by frictional engagement with the article 12 which moves in a linear direction during the process of welding.

Spaced electrodes 31 and 32 are positioned symmetrically with respect to the electrode 20 in proximity to the edges 17 and 18 of the tube 12 so as to create the flow of heating currents between the edges 17 and 18 of the tube 12 and the metallic insert strip 19. To avoid back leakage, potentials of like polarity are applied through the electrodes 31 and 32 to create the passage of current to or from the electrode 20 which is of opposite polarity. To this end, the electrode 20 has the contact plates 26 thereof disposed in the path of a lead 33 of an electrical transformer for continuous contact therewith to furnish current of proper potential and amperage. The electrodes 31 and 32 are carried by members 34 which are electrically connected to the other terminal (not shown) of the transformer to pass the proper heating currents between the edges 17 and 18 of the article 12 in effecting coalescence with the metallic insert strip 19. It is worthy of note that the electrodes 31 and 32 may be composed of flexible strips embedded in their supports 34 in much the same manner as the contact plates 26 are secured to the electrode 20.

With this arrangement, the heating currents can flow only through the portion $a$—$c$ of the tube 12 without the possibility of stray currents passing around the back $a$—$b$—$c$ of the tube 12 which ordinarily results upon the application of electrodes to tubular members with known appliances. Ordinarily the back leakage is comparatively great in small tubes or pipes; consequently the formation of an incomplete tubular member with a metallic segment to form a complete tubular member serves not only to enable the use of electrodes having a comparatively large surface area which precludes excessive temperatures in the vicinity thereof, but also eliminates back leakage as is apparent from the above discussion.

In order to retain the metallic insert strip 19 in proper association with the tube 12 to constitute a closure therefor, idler rollers 35 and 36 are carried on inclined axes 37 and 38 for rotary movement on pins 39 secured to frame 10 in any suitable manner. As shown, the idler rollers 35 and 36 consist of confronting discs 40 separated by an insulator plate 41, and are provided with spaced peripheral ridges 42 which engage the tube 12 and the strip 19. The frictional engagement of the ridges 42 in the vicinity of the confronting spaced edges 17 and 18 of the tube 12, exerts a radial pressure thereon to create a circumferential stress reaction in the edges 17 and 18 during the passage of heating currents between the electrodes 20 and 31—32 to effect coalescence.

It should be observed that the yieldable contact plates 26 provided in the electrode 20 are slightly deformed (Figure 2) responsive to the frictional engagement thereof with the metallic insert strip 19 to increase the extent of contact (designated d—e, Figure 2) so that a comparatively long preheating area is provided just prior to coalescence.

In order to minimize the friction between the rotary electrode 20 and the article 12 contacting therewith, it has been found desirable to cause the electrode 20 to be rotated by the frictional engagement between the electrode and the tube, and the resultant movement of the latter. It may, however, be desirable to provide separate driving means for the electrode and to synchronize the rotation of the electrode with the travel of the tubular article so that the two will travel at the same velocity and thus avoid slippage between the same.

The comparatively large area of the contact plates 26 is instrumental in precluding excessive temperatures in the vicinity thereof; however, to avoid the destruction of the contact plates over long periods of operation, cooling means are provided in addition to the cooling effect of air circulation between the individual metallic contact strips 26 constituting a laminated electrode. To this end, the electrode 20 is provided with a chamber 43 interiorly thereof which latter is connected to a suitable water supply through concentric passages 47 and 52 in the tubular shaft 22, the passages at the end of the shaft being connected in any suitable manner to inlet and outlet tubes 46 and 54 and an intermediate valve 48 which latter may be so constructed as to telescopically engage within a recess in the end of the shaft, as at 49. The inner end of the passage 47 is preferably connected to a pipe 44 which extends into the chamber 43 and serves to project the incoming water against the outer end portions of the electrode.

It is to be noted that the passage 52 is of larger diameter than the passage 45 that communicates with the tube 44, thereby defining a shoulder 54 which is engaged by a peripheral flange 55 provided on the extremity of the conduit for preventing the passage of water from the incoming passage 47 directly to the outgoing passage 52. The concentric passage 52 communicates with a conduit 54 through the valve body 48 so as to enable the escape of the water which has circulated through the annular chamber 43 provided within the electrode 20. It will, therefore, be apparent that a circulatory path is established for the water which constitutes the cooling medium for the laminated electrode 20 having the flexible contact plate 26 embedded in the periphery thereof.

Various changes may be made in the embodiment of the invention herein specifically described without departing from or sacrificing any of the advantages thereof as defined in the appended claims.

We claim:

1. The combination with supporting means to guide an article along a predetermined path, of means for feeding said article along said path, idler rollers in the path of the article to create circumferential stresses therein, a rotatable electrode having laminations on the periphery thereof adapted to contact with the article, and another electrode to effect the passage of heating currents through a portion of the article.

2. The combination with supporting means to guide an article along a predetermined path, of means for feeding said article along said path, idler rollers in the path of the article to create circumferential stresses therein, a rotatable electrode having flexible laminations on the periphery thereof adapted to contact with the article, and another electrode to effect the passage of heating currents through a portion of the article.

3. The combination with supporting means to guide an article along a predetermined path, of means for feeding said article along said path, idler rollers in the path of the article to create circumferential stresses therein, a rotatable electrode adapted to contact with the article, another electrode to effect the passage of heating currents through a portion of the article, and an electrical lead in the path of said rotatable electrode to contact therewith for conveying heating currents to the article.

4. The combination with means for feeding an article along a predetermined path, of a rotary electrode in the path of the article to contact therewith, and yieldable contact plates on the periphery of said electrode to establish an extended contact area with the article.

5. The combination with means for feeding an article along a predetermined path, of a rotary electrode in the path of the article to contact therewith, yieldable contact plates on the periphery of said electrode to establish an extended contact area with the article, and spaced electrodes of like polarity contacting with the article to pass heating currents therethrough to said rotary electrode.

6. The combination with means for feeding an article along a predetermined path, of a rotary electrode in the path of the article to contact therewith, yieldable contact plates on the periphery of said electrode to establish an extended contact area with the article, spaced electrodes of like polarity contacting with the article to pass heating currents therethrough to said rotary electrode, and an electrical lead in the path of said rotary electrode to convey electric currents therethrough.

7. A method of progressively manufacturing a tubular article which comprises shaping a flat strip of metal into an incomplete tube with the longitudinal edges thereof in substantial spaced relation, inserting a second strip of metal having a curvature corresponding to the peripheral curvature of the incomplete tube between said edges to form a complete tubular member, connecting said inserted portion of the tube to one terminal of an electrical source, and connecting the other portion of the tube to the opposite terminal of an electric source and thereby passing an electric current across the edges in progression therealong to complete the welding thereof.

8. A method of progressively producing a tubular article which comprises converting a flat strip of metal into a segment of a tube, converting a second strip of metal into a complemental segment of a tube, bringing the longitudinal edges of said segments into welding relation to thereby form a closed tubular member, connecting one of said segments to one terminal of an electrical source, connecting the other segment to another terminal of an electrical source, and passing an electric current through said segments in progression therealong to effect a welding of the edges thereof.

9. In combination with an electrode for electric welding comprising an electrode roller having resilient peripheral contacting elements, means to cause the articles to be welded to travel in a path adjacent said roller, and means to cause said resilient contacting elements of said roller to engage the article and to travel therewith a predetermined distance.

WILLIAM E. CRAWFORD.
REIMAR C. F. KURTZE.